A. N. N. AUBIN & J. P. COLNE.

Mold for Making Glass.

No. 133,515. Patented Dec. 3, 1872.

UNITED STATES PATENT OFFICE.

AIMÉ NICHOLAS NAPOLEON AUBIN, OF PORTLAND, CONNECTICUT, AND JEAN PIERRE COLNÉ, OF WASHINGTON, DISTRICT OF COLUMBIA.

IMPROVEMENT IN MOLDS FOR WORKING GLASS.

Specification forming part of Letters Patent No. 133,515, dated December 3, 1872; antedated November 27, 1872.

*To all whom it may concern:*

Be it known that we, AIMÉ NICHOLAS NAPOLEON AUBIN, of Portland, Connecticut, and JEAN PIERRE COLNÉ, of Washington city, District of Columbia, have invented certain Improvements in Molds for Blowing Glass, of which the following is a specification:

The first part of our invention relates to the substitution of lignite in a plastic form for the wood or other substances used in the construction of molds for blowing glass. The second part of our invention relates to the addition to the lignite of certain substances to prevent the contraction in drying, and to render the lignite more compact and solid. The third part of our invention relates to the combination, with the lignite and other substances already mentioned, of carbonized matters for the purpose of securing porosity in the composition, and preventing its too rapid destruction by the contact of the melted glass. The fourth part of our invention relates to the addition of powdered resin for the purpose of further solidifying the mold. The fifth part of our invention relates to the addition, while working, of certain substances for the purpose of lubrifying the mold and facilitating the rotation of the object while being formed in the mold. The sixth part of our invention relates to the manner of preparing the mold when a plastic composition, as indicated above, is used.

Figure 1:
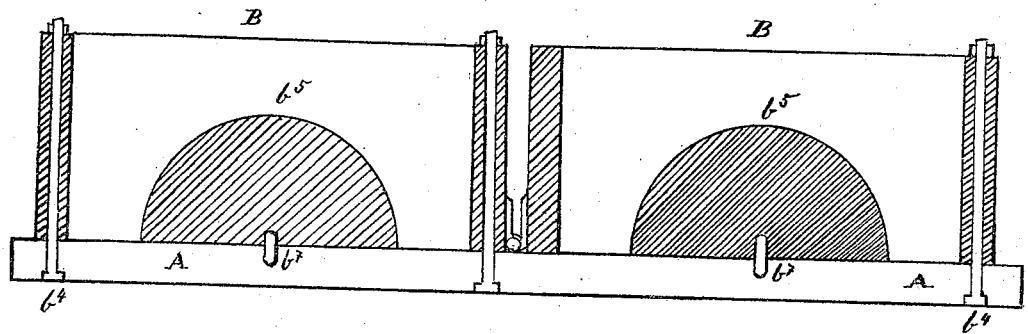
Figure 11:
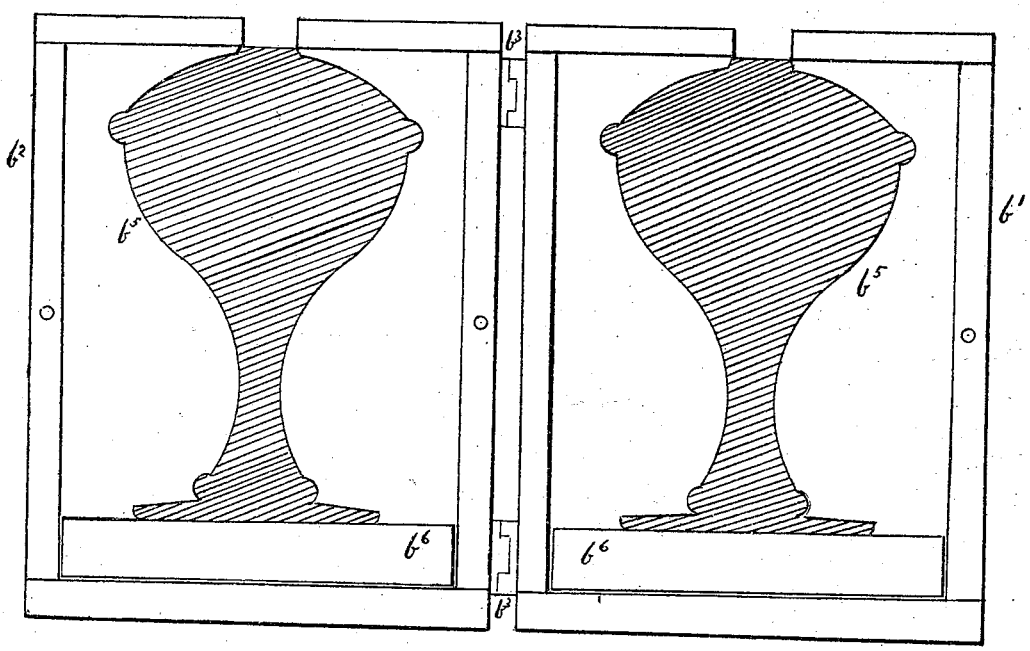

Figure 1 is a cross-section of the two halves of the mold when placed upon its mold-board for filling. Fig. 2 shows the two halves of the mold open and placed on end.

A, square or oblong board; B B, mold. It is composed of two frames, $b^1$ and $b^2$, of wood or metal, connected by hinges $b^3$. It is firmly fixed to the board by means of bolts $b^4$ $b^4$, in order to keep it in its place and preventing its rising or moving while the composition is placed in the frame to form the mold. $b^5$ $b^5$, model of the object to be worked in glass when the mold is constructed. The model is of wood, and divided into two halves, having dowels $b^7$ to place them on the board upon a center line corresponding to the center of the cavity of the frames, so that when the mold is shut for use the form of the object imprinted in the composition in each half of the mold corresponds exactly. $b^6$, movable board to form the flat bottom of the object to be blown in the mold. This is of wood, and can easily be raised or replaced as it wears out.

The wooden molds now in use in glass-works are of comparatively costly construction, and wear out rapidly by alternate charring and wetting. They often split, and have then to be replaced, and cannot always be obtained of uniform size or shape. In order to remedy that difficulty we replace the wood by lignite in a plastic form. Ordinary paper-pulp, or *papier-maché*, is the substance we find most available for our purpose, as it can be molded to any desired form, and any number of molds produced from one single model at a trifling cost. It partakes of all the properties of wood except its rapid destructibility. It chars and forms a porous carbon surface, easily wetted or greased, and upon which the glass while being blown easily slips and does not adhere. It being a very bad conductor of heat it lasts long, and as its fibers are interwoven in every direction the heat does not split it to any inconvenient depth.

In order to solidify it more and to prevent shrinkage in drying, we mix plaster in powder and form, with the pulp, a paste, which is rapidly pressed in the frames so as to fill up all the vacant space around the model. Talc, powdered mica, asbestus, &c., can also be advantageously added for the same purpose. As it is desirable also to have as much carbonized material as possible in the composition, we find it advantageous to mix with it ground charcoal or lamp-black, the proportions to vary according to the work to be done in the mold, thick articles requiring more of the carbonized material than thin ones. We also find it useful, in order to increase the solidity of the mold as it is used, to add to the composition powdered resin, which melts when the heat reaches it, and pervades the composition, increasing the adhesion of its component parts, and also furnishing a carbonizing matter on the surface of the cavity of the mold. The sharp edges can be preserved longer by inserting in the composition where required thin plates of metal cut to the profile of the model.

Holes are left in the mold to allow the expanded air or vapors to escape, and thus not to interfere with the shape of the object blown.

The mold being constructed as just described, we find that we can facilitate the working of the glass by putting in the cavity of the mold, instead of water, substances which can partially vaporize and carbonize in contact with the hot glass, and thus act as lubricators. Glycerine, either pure or mixed with water, bees-wax, lard, &c., answer the purpose well. In the model one-half of the mold contains an addition of lamp-black.

What we claim as our invention is—

1. A mold for working glass, constructed of lignite in a plastic form, constructed and operated substantially and for the purpose as hereinbefore set forth.

2. A mold for working glass, made of lignite or paper-pulp and plaster or other such substance, for the purpose of rendering the lignite more compact and preventing shrinkage in drying, the whole constructed and operated substantially as hereinbefore set forth.

3. A mold for working glass, made of lignite, plaster, powdered coal or charcoal or lamp-black, the whole constructed and operated substantially and for the purpose as hereinbefore set forth.

4. A mold for working glass, made of lignite, plaster, powdered carbon or carbonized substance, and powdered resin, the whole constructed and operating substantially and for the purpose as hereinbefore set forth.

5. Glycerine, either pure or mixed with water, lard, or bees-wax passed over the interior surface of molds for working glass, while operating, substantially and for the purpose as hereinbefore set forth.

6. The frames $b^1$ and $b^2$ and board A, in combination with a composition mold, such as substantially described, constructed, and operated, and for the purpose as hereinbefore set forth.

AIMÉ N. N. AUBIN.
JEAN PIERRE COLNÉ.

Witnesses:
CHARLES FLAESCH,
J. G. DOUGLASS.